(12) United States Patent
Dumke et al.

(10) Patent No.: US 7,902,285 B2
(45) Date of Patent: Mar. 8, 2011

(54) RUBBER MIXTURE AND TIRES

(75) Inventors: Joachim Dumke, Lehrte (DE); Dietmar Soehnen, Lauenau (DE); Annette Stark, Hannover (DE); Christian Struebel, Hannover (DE); Hajo Weinreich, Hessisch Oldendorf (DE)

(73) Assignee: Continental Aktiengesellschaft, Hannover (DE)

( * ) Notice: Subject to any disclaimer, the term of this patent is extended or adjusted under 35 U.S.C. 154(b) by 1091 days.

(21) Appl. No.: 11/622,890

(22) Filed: Jan. 12, 2007

(65) Prior Publication Data

US 2007/0167557 A1   Jul. 19, 2007

(30) Foreign Application Priority Data

Jan. 14, 2006   (EP) .................................... 06000792

(51) Int. Cl.
*C08K 5/01* (2006.01)
*B60C 1/00* (2006.01)

(52) U.S. Cl. ......... 524/476; 152/905; 524/490; 524/495; 524/496; 524/571

(58) Field of Classification Search .................. 524/490, 524/476, 495, 496, 571; 152/905
See application file for complete search history.

(56) References Cited

U.S. PATENT DOCUMENTS

| | | | |
|---|---|---|---|
| 4,158,682 A * | 6/1979 | Price et al. | 264/40.4 |
| 4,840,988 A * | 6/1989 | Nakayama et al. | 524/476 |
| 5,780,537 A * | 7/1998 | Smith et al. | 524/493 |
| 5,901,766 A | 5/1999 | Sandstrom et al. | |
| 6,103,808 A | 8/2000 | Hashimoto | |
| 6,822,043 B2 * | 11/2004 | Sohnen et al. | 524/592 |
| 2004/0092644 A1 | 5/2004 | Labauze | |

FOREIGN PATENT DOCUMENTS

| | | |
|---|---|---|
| EP | 0940462 | 9/1999 |
| EP | 1075967 | 2/2001 |
| EP | 0899297 | 10/2001 |
| EP | 1589068 | 10/2005 |
| WO | WO 02072688 A1 * | 9/2002 |
| WO | WO 2004031277 A1 * | 4/2004 |
| WO | 2005/087859 | 9/2005 |

OTHER PUBLICATIONS

The American Heritage Dictionary of the English Language, 3$^{rd}$ Edition, Houghton Mifflin Company, 1996, ISBN 0-395-44895-6, p. 1535.*

Canning SP American Society for Testing and Materials: "1991 Annual Book of ASTM Standards, vol. 09.01", Rubber, Natural and Synthetic—General Test Methods; Carbon Black. Includes Standards on Following Committees: D11 on Rubber, D24 on Carbon Black, Annual Book of ASTM Standards, Philadelphia, ASTM, US, Bd, 9.01, 1991, p. 317, XP002351270.

Null, "Safe Process Oils for Tires with Low Environmental Impact," Kautschuk Gummi Kunststoffe, Dec. 1999, pp. 799-805.

* cited by examiner

*Primary Examiner* — Vickey Nerangis
(74) *Attorney, Agent, or Firm* — Greenblum & Bernstein, P.L.C.

(57) ABSTRACT

Sulfur-vulcanizable rubber mixture without aromatic process oils, in particular for the tread rubber of vehicle pneumatic tires, containing at least one diene rubber, carbon black, mineral oil plasticizer, and resin. A vehicle pneumatic tire with a tread rubber that is composed at least partially of a rubber mixture of this type vulcanized with sulfur is also disclosed. To improve the chipping and chunking behavior, the rubber mixture can contain at least one diene rubber, 5-100 phr of at least one carbon black with an iodine adsorption number of 100-180 g/kg and a DBP number of 100-150 cm$^3$/100 g, 5-80 phr of at least one mineral oil plasticizer that has a content of polycyclic aromatic compounds determined with the DMSO extract according to the IP 346 method of less than 3% by weight relative to the total weight of the mineral oil plasticizer, and 5-30 phr of at least one resin with an average molecular weight determined with GPC of less than 400 g/mol and a softening point (ring and ball according to ASTM E 28) of less than 40° C.

14 Claims, No Drawings

US 7,902,285 B2

RUBBER MIXTURE AND TIRES

CROSS-REFERENCE TO RELATED APPLICATIONS

The present application claims priority under 35 U.S.C. §119 of European Patent Application No. 06000792.9, filed Jan. 14, 2006, the disclosure of which is expressly incorporated by reference herein in its entirety.

BACKGROUND OF THE INVENTION

1. Field of the Invention

The invention relates to a sulfur-vulcanizable rubber mixture without aromatic process oils, in particular for the tread rubber of vehicle pneumatic tires, containing at least one diene rubber, carbon black, mineral oil plasticizer, and resin. The invention also relates to a vehicle pneumatic tire with a tread rubber that is composed at least partially of a rubber mixture of this type vulcanized with sulfur.

2. Discussion of Background Information

Since the driving properties of a tire, in particular a vehicle pneumatic tire, are dependent to a large extent on the rubber composition of the tread rubber, particularly high demands are made on the composition of the tread rubber mixture. Thus various tests have been undertaken to affect the properties of the tire favorably by varying the polymer components, the fillers, and the other additives in the tread rubber mixture. It must be taken into consideration thereby that an improvement in the one tire property often entails a deterioration in another property. For tread rubber mixtures for automobile and van tires, for example, maximum demands are made with respect to the ABS dry braking and ABS wet braking, abrasion resistance, rolling resistance, handling, and durability.

Resins are additives for rubber mixtures for tire tread rubbers that have been known for a long time. They serve above all as processing aids and effect the necessary green tackiness of the rubber mixtures. Moreover, vulcanizate properties determined by the resins, such as hardness, modulus, and swelling behavior, can be affected. They can also be used as vulcanization resins or coupling agents. Adhesive resins typically used in the rubber industry are, e.g., coumarone-indene resins, petroleum resins, terpene resins, colophony resins, and phenol-formaldehyde resins.

It is known from EP-A 1 589 068, which is incorporated by reference herein in its entirety, for example, that for a higher flexibility with a simultaneously high stiffness, a rubber mixture for the tread rubber base contains cis-1,4-polyisoprene, polybutadiene with a high cis percentage, mineral oil plasticizers with a low content of polycyclic aromatic compounds, and carbon black, e.g., of the N121 type. The rubber mixture can also contain adhesive resins, which are not specified in more detail.

EP-B-0 899 297 and its family member U.S. Pat. No. 5,901,766, which are incorporated by reference herein in their entireties, disclose rubber mixtures for tire tread rubbers that are intended to provide an improved abrasion resistance and improvements in the traction and handling. The mixtures contain a rubber with a glass transition temperature of −80° C. to −110° C., another rubber with a higher glass transition temperature, carbon black, e.g., of the N220 type, aromatic plasticizer oil, and 15 to 50 phr of a resin. This resin can be for example coumarone-indene resins with an average molecular weight of 420 to 700 g/mol.

WO 02/072688 A1 and its family member U.S. Patent Publication No. 2004/0092644 A1, which are incorporated by reference herein in their entireties, also describe rubber mixtures that in addition to rubbers with different glass transition temperatures, aromatic plasticizer oils, and carbon black, also have resins with an average molecular weight of 400 to 2000 g/mol, e.g., coumarone-indene resins.

An important aspect in the area of durability is the chipping and chunking behavior of tread rubber mixtures. Chipping denotes thereby the flake-like detachment at the tire tread (thin peeling-off of rubber material) while driving over bad roads, while chunking denotes the breaking-out of large-volume pieces (e.g., tread lugs). The chipping and chunking behavior is further intensified by bad road conditions above all in countries with dry and hot climatic conditions—a critical tire property that is to be improved.

SUMMARY OF THE INVENTION

The present invention provides improved rubber mixtures, in particular for the tread rubbers of vehicle pneumatic tires, especially with respect to their chipping and chunking behavior.

The present invention provides rubber mixtures that are free of aromatic process oils and contain:
- at least one diene rubber,
- 5-100 phr of at least one carbon black with an iodine adsorption number of 100-180 g/kg and a DBP number of 100-150 cm$^3$/100 g,
- 5-80 phr of at least one mineral oil plasticizer that has a content of polycyclic aromatic compounds determined with the DMSO extract according to the IP 346 method of less than 3% by weight relative to the total weight of the mineral oil plasticizer, and
- 5-30 phr of at least one resin with an average molecular weight determined by GPC of less than 400 g/mol and a softening point (ring and ball according to ASTM E 28) of less than 40° C.

The present invention also provides a sulfur-vulcanizable rubber mixture without aromatic process oils formed by combining at least the following:
  (a) at least one diene rubber;
  (b) 5-100 phr (parts by weight, relative to 100 parts by weight of the total rubbers in the mixture) of at least one carbon black with an iodine adsorption number of 100-180 g/kg and a DBP number of 100-150 cm$^3$/100 g;
  (c) 5-80 phr of at least one mineral oil plasticizer that has a content of polycyclic aromatic compounds determined with the DMSO extract according to the IP 346 method of less than 3% by weight relative to the total weight of the mineral oil plasticizer; and
  (d) 5-30 phr of at least one resin with an average molecular weight determined with GPC of less than 400 g/mol and a softening point (ring and ball according to ASTM E 28) of less than 40° C.

The present invention also provides a tire tread comprising a rubber mixture, which can be vulcanized.

The present invention also provides a method of producing a sulfur-vulcanizable rubber mixture without aromatic process oils comprising combining at least the following:
  (a) at least one diene rubber;
  (b) 5-100 phr (parts by weight, relative to 100 parts by weight of the total rubbers in the mixture) of at least one carbon black with an iodine adsorption number of 100-180 g/kg and a DBP number of 100-150 cm$^3$/100 g;
  (c) 5-80 phr of at least one mineral oil plasticizer that has a content of polycyclic aromatic compounds determined with the DMSO extract according to the IP 346 method of less than 3% by weight relative to the total weight of the mineral oil plasticizer; and (d) 5-30 phr of at least one resin with an average molecular weight determined with GPC of less than 400 g/mol and a softening point (ring and ball according to ASTM E 28) of less than 40° C.

The carbon black can have an iodine adsorption number of 110-130 g/kg, and a DBP number of 120-140 cm$^3$/100 g.

The resin can be a coumarone-indene resin.

The resin can have an average molecular weight determined with GPC of 250-300 g/mol.

The resin can have a softening point (ring and ball according to ASTM E 28) of less than 20° C.

The rubber mixture can be formed by combining at least:
- 5-70 phr of at least one of natural rubber, polybutadiene, and synthetic polyisoprene;
- 30-95 phr of at least one emulsion-polymerized styrene-butadiene copolymer; and
- 30-100 phr of at least one carbon black with an iodine adsorption number of 100-180 g/kg and a DBP number of 100-150 cm$^3$/100 g. Moreover, the rubber mixture can further include combining up to 50 phr of at least one other styrene-butadiene copolymer.

The rubber mixture can be formed by combining at least:
- 5-70 phr of at least one of natural rubber, polybutadiene, and synthetic polyisoprene;
- 30-95 phr of at least one solution-polymerized styrene-butadiene copolymer with a vinyl percentage of above 35%;
- 5-35 phr of at least one carbon black with an iodine adsorption number of 100-180 g/kg and a DBP number of 100-150 cm$^3$/100 g; and
- 20-100 phr of silica. Moreover, the rubber mixture can further include combining up to 60 phr of at least one other styrene-butadiene copolymer.

The present invention also provides a vehicle pneumatic tire with a tread rubber that at least partially comprises a rubber mixture vulcanized with sulfur.

The rubber mixture can comprise a tread rubber for a vehicle pneumatic tire.

The rubber mixture can be vulcanized.

DETAILED DESCRIPTION OF THE INVENTION

The term phr used in this document (parts per hundred parts of rubber by weight) thereby refers to the amount for mixture formulations customary in the rubber industry. The metering of the parts by weight of the individual substances is thereby always relative to 100 parts by weight of the total mass of all rubbers present in the mixture.

Aromatic process oils are understood to mean mineral oil plasticizers that according to ASTM D 2140 contain more than 25% by weight, preferably more than 35% weight, of aromatic constituents ($C_A$), less than 45% weight of naphthenic constituents ($C_N$), and less than 45% weight of paraffinic constituents ($C_P$). The viscosity-gravity constant according to ASTM D 2140 (VGC) of aromatic process oils is greater than 0.9. Moreover the aromatic process oils according to ASTM D 2226 are classified as oil type 101 and 102.

The polycyclic aromatic compounds comprise aromatic hydrocarbons that contain more than three fused aromatic rings, and the heterocyclic compounds with sulfur and/or nitrogen derived therefrom. The rings can be substituted with short alkyl or cycloalkyl groups.

Surprisingly, it was found that through the specific combination of 5 to 100 phr of a so-called active carbon black having a high structure (high DBP number) and a large surface (high iodine adsorption number), with 5-80 phr of at least one mineral oil plasticizer having a low content of polycyclic compounds, and with 5-30 phr of at least one resin having a low average molecular weight (<400 g/mol) and a low softening point (<40° C.), the chipping and chunking behavior can be distinctly improved. Other desired tire properties, such as ABS braking, rolling resistance, and abrasion, thereby remain on at least the same level.

The sulfur-vulcanizable rubber mixture contains at least one diene rubber. The diene rubbers include all rubbers with an unsaturated carbon chain that are derived at least partially from conjugated dienes. It is particularly preferred if the diene rubber or the diene rubbers is selected from at least one of natural rubber (NR), synthetic polyisoprene (IR), polybutadiene (BR), and styrene-butadiene copolymer (SBR). These diene elastomers can readily be processed to produce the rubber mixture and result in good tire properties in the vulcanized tires.

The rubber mixture can contain polyisoprene (IR, NR) as the diene rubber. This can thereby be cis-1,4-polyisoprene as well as 3,4-polyisoprene. However, the use of cis-1,4-polyisoprenes with a cis-1,4 percentage >90% by weight is preferred. On the one hand, a polyisoprene of this type can be obtained by stereospecific polymerization in solution with Ziegler-Natta catalysts or using finely dispersed lithium alkylene. On the other hand, natural rubber (NR) is a cis-1,4-polyisoprene of this type; the cis-1,4 percentage in natural rubber is greater than 99% by weight.

If the rubber mixture contains polybutadiene (BR) as a diene rubber, it can thereby be cis-1,4-polybutadiene as well as vinyl-polybutadiene (40-90% by weight of vinyl). The use of cis-1,4-polybutadiene with a cis-1,4 percentage greater than 90% by weight is preferred, which can be produced, e.g., by solution polymerization in the presence of catalysts of the rare earth type.

The styrene-butadiene copolymer can be solution-polymerized styrene-butadiene copolymer (S-SBR) with a styrene content, relative to the polymer, of approx. 10 to 45% by weight and a vinyl content (content of 1,2-bound butadiene, relative to the total polymer) of 10 to 80% by weight, which can be produced for example using lithium alkylene in an organic solvent. The S-SBR can also be coupled and end-group-modified. However, emulsion-polymerized styrene-butadiene copolymer (E-SBR) and mixtures of E-SBR and S-SBR can also be used. The styrene content of the E-SBR is approx. 15 to 50% by weight, and types, such as known in the prior art, which are obtained by copolymerization of styrene and 1,3-butadiene in aqueous emulsion, can be used.

In addition to the above-named diene rubbers, however, the mixture can also contain other rubber types such as, e.g. styrene-isoprene-butadiene terpolymer, butyl rubber, halobutyl rubber, or ethylene-propylene-diene rubber (EPDM).

The rubber mixture according to the invention contains 5-100 phr of the active carbon black(s). The active carbon black has an iodine adsorption number (according to ASTM D 1510) of 100-180 g/kg, preferably 110-130 g/kg, and a DBP number (according to ASTM D 2414) of 100-150 cm$^3$/100 g, preferably 120-140 cm$^3$/100 g. For example, carbon blacks of the types N-242 and N-121 or HV3396 can be used.

In the mixture according to the invention, 5-80 phr of a mineral oil plasticizer or combinations of several mineral oil plasticizers are used. This amount of plasticizer guarantees an optimum processability with good dynamic properties and good low-temperature flexibility. As the mineral oil plasticizer whose contents of polycyclic aromatic compounds (PCA content) determined with the DMSO extract according to the IP 346 method are less than 3% by weight relative to the total weight of the mineral oil plasticizer in principle all mineral oil plasticizers known to one skilled in the art that fulfill these values, can be used, Mineral oil plasticizers of this type are, edgy, MES (mild extraction solvate), which is obtained by solvent extraction of heavy oil distillates or by treating heavy oil distillates with hydrogen in the presence of a catalyst (hydrogenation), or TDAE (treated distillate aromatic extract). As far as these mineral oil plasticizers are concerned, reference should be made in this connection by way of example to V. Null, "Safe Process Oils for Tires with Low Environmental Impact," Kautschuk Gummi Kunststoffe, December 1999, pp. 799-805, which is incorporated by reference herein in its entirety. The use of mineral oil plasticizers of this type in rubber mixtures is also known, e.g., from EP 0 940 462 A2 and its family member U.S. Pat. No. 6,103,808, which are incorporated by reference herein in their entireties.

If a mineral oil plasticizer with a glass transition temperature of less than −45° C. is used, the low-temperature flexibility at lower temperatures can be further improved.

As resins, all resins known to one skilled in the art with the appropriate molecular weights and softening points can be used. The resin is preferably a coumarone-indene resin. For example, resins of the Novares® C10 and C30 type from Rütgers Chemicals AG, Duisburg can be used, which are available as aromatics extract substitute for diene rubber mixtures.

For process engineering reasons, it has proved to be advantageous if the resin has an average molecular weight determined with GPC of 250 to 300 g/mol and/or a softening point of less than 20° C. These resins can be injected without strong heating into the mixers customarily used for the production of rubber mixtures. Moreover, tires with a tread rubber with a mixture of this type exhibit an improved traction.

As fillers, the rubber mixture can also contain, in addition to the active carbon black, other carbon blacks, silica, aluminum hydroxide, layer-lattice silicate, chalk, starch, magnesium oxide, titanium dioxide, rubber gels, short fibers, etc. in any desired combinations.

In addition to the components named above, the rubber mixture can contain other additives customary in the rubber industry such as, e.g., other plasticizers, anti-aging agents, activators such as, e.g., zinc oxide and fatty acids (e.g., stearic acid), waxes, coupling agents for binding polar fillers to rubber, and mastication auxiliaries in the customary parts by weight.

The vulcanization is carried out in the presence of sulfur or sulfur donors, whereby some sulfur donors can act as vulcanization accelerators at the same time. Sulfur or sulfur donors are added to the rubber mixture in the last mixing step in the amounts customarily used by one skilled in the art (0.4 to 4 phr, sulfur preferred in amounts of 1.5 to 2.5 phr).

Moreover the rubber mixture can contain vulcanization-influencing substances such as vulcanization accelerators, vulcanization retarders, and vulcanization activators in customary amounts, in order to control the required time and/or the required temperature of the vulcanization and to improve the vulcanizate properties. The vulcanization accelerators can be selected thereby for example from the following accelerator groups: thiazole accelerators such as, e.g., 2-mercaptobenzothiazole, sulfenamide accelerators such as, e.g., benzothiazyl-2-cyclohexylsulfenamide (CBS), guanidine accelerators such as, e.g., N,N'-diphenylguanidine (DPG), dithiocarbamate accelerators such as, e g., zinc dibenzyldithiocarbamate, disulfides. The accelerators can also be used in combination with one another, whereby synergistic effects can result.

If the rubber mixture according to the invention is a so-called carbon black mixture, i.e., a mixture that essentially contains carbon black as filler, according to a preferred development of the invention the rubber mixture has at least the following constituents in the stated amounts:

5-70 phr of natural rubber, polybutadiene, and/or synthetic polyisoprene,
30-95 phr of at least one emulsion-polymerized styrene-butadiene copolymer,
0-50 phr of at least one other styrene-butadiene copolymer, and
30-100 phr of at least one carbon black with an iodine adsorption number of 100-180 g/kg and a DBP number of 100-150 cm$^3$/100 g.

In contrast, if the rubber mixture according to the invention is a so-called silica mixture, i.e., a mixture that essentially contains silica as filler, according to an alternative development of the invention the rubber mixture has at least the following constituents in the stated amounts:

5-70 phr of natural rubber, polybutadiene, and/or synthetic polyisoprene,
30-95 phr of at least one solution-polymerized styrene-butadiene copolymer with a vinyl percentage of above 35%,
0-60 phr of at least one other styrene-butadiene copolymer,
5-35 phr of at least one carbon black with an iodine adsorption number of 100-180 g/kg and a DBP number of 100-150 cm$^3$/100 g, and
20-100 phr of silica.

Compared with carbon black mixtures, silica mixtures excel in their better braking behavior and a lower rolling resistance.

The rubber mixture according to the invention can be produced in any manner, such as in any conventional manner, whereby first as a rule a base mixture that contains all constituents with the exception of the vulcanization system (sulfur and vulcanization-influencing substances), is produced in one or more mixing steps and then the fully compounded stock is produced by adding the vulcanization system. Then the mixture is further processed, e.g., by an extrusion procedure, and is brought into the appropriate shape. Preferably, the mixture is brought into the shape of a tread rubber. A tread rubber mixture preform produced in this manner is applied as is known in the production of the vehicle pneumatic tire preform. However, the tread rubber, in the form of a narrow strip of rubber mixture, can also be wound onto a tire preform that already contains all the tire parts except for the tread rubber. With tires it is of no importance whether the entire tread rubber has been produced from a single mixture or has, e.g., a cap and base construction, since it is important that at least the surface coming into contact with the roadway, which surface is exposed to the chipping and chunking, has been produced from the rubber mixture according to the invention.

EXAMPLES

The invention is now to be explained in more detail on the basis of non-limiting comparative examples and exemplary embodiments that are summarized in Tables 1 and 2.

In all the mixture examples contained in Tables 1 and 2, the stated amounts are parts by weight, relative to 100 parts by weight of total rubber (phr). The comparative mixtures are identified by V, the mixtures according to the invention by E. The mixtures of Table 1 are carbon black mixtures; silica mixtures are listed in Table 2. The mixtures were adjusted to the same hardness.

Tires whose tread rubbers were composed of the stated mixtures, were produced with the mixtures according to Table 1 and 2. With these tires, comparative tests were carried out with respect to the chipping and chunking behavior, the ABS wet braking, the ABS dry braking, the rolling resistance, and the abrasion. The corresponding properties of tires with a tread rubber of a conventional mixture according to V(1) and V(6) were set at 100; values above 100 denote an improvement in the respective property (rating).

TABLE 1

|  | Unit | 1(V) | 2(V) | 3(V) | 4(V) | 5(E) |
|---|---|---|---|---|---|---|
| Constituents |  |  |  |  |  |  |
| Natural-rubber | phr | 5 | 5 | 5 | 5 | 5 |
| BR[a] | phr | 15 | 15 | 15 | 15 | 15 |
| E-SBR[b] | phr | 80 | 80 | 80 | 80 | 80 |
| Carbon black N-339 | phr | 80 | 80 | — | 80 | — |
| Carbon black N-121 | phr | — | — | 80 | — | 80 |
| Aromatic process oil | phr | 30 | — | 33 | 20 | — |
| TDAE[c] | phr | — | 27 | — | — | 20 |
| Resin[d] | phr | — | — | — | 10 | 10 |
| Anti-aging agent | phr | 1.5 | 1.5 | 1.5 | 1.5 | 1.5 |
| Zinc oxide | phr | 2 | 2 | 2 | 2 | 2 |
| Stearic acid | phr | 1 | 1 | 1 | 1 | 1 |
| Accelerator | phr | 1.9 | 1.9 | 1.9 | 1.9 | 1.9 |
| Sulfur | phr | 2.1 | 2.1 | 2.1 | 2.1 | 2.1 |
| Tire property |  |  |  |  |  |  |
| Chipping and chunking |  | 100 | 95 | 93 | 100 | 125 |
| ABS dry braking |  | 100 | 99 | 100 | 102 | 102 |
| ABS wet braking |  | 100 | 98 | 102 | 103 | 103 |
| Rolling resistance |  | 100 | 102 | 98 | 98 | 100 |
| Abrasion |  | 100 | 102 | 105 | 100 | 110 |

[a]High-cis polybutadiene
[b]E-SBR 1500, styrene content: 23.5% by weight
[c]treated distillate aromatic extract
[d]Coumarone-indene resin, $M_w$ = 270 g/mol, softening point: approx. 10° C., Novares ®C10, Rutgers Chemicals AG, Germany

TABLE 2

|  | Unit | 6(V) | 7(V) | 8(V) | 9(V) | 10(E) |
|---|---|---|---|---|---|---|
| Constituents |  |  |  |  |  |  |
| Natural rubber | phr | 30 | 30 | 30 | 30 | 30 |
| High-vinyl S-SBR[e] | phr | 70 | 70 | 70 | 70 | 70 |
| Silica[f] | phr | 85 | 85 | 85 | 85 | 85 |
| Carbon black N-339 | phr | 15 | 15 | — | 15 | — |
| Carbon black N-121 | phr | — | — | 15 | — | 15 |
| Aromatic process oil | phr | 20 | — | 22 | 10 | — |
| TDAE[c] | phr | — | 17 | — | — | 10 |
| Resin[d] | phr | — | — | — | 10 | 10 |
| Processing aid | phr | 4 | 4 | 4 | 4 | 4 |
| Anti-aging agent | phr | 4 | 4 | 4 | 4 | 4 |
| Zinc oxide | phr | 2 | 2 | 2 | 2 | 2 |
| Stearic acid | phr | 1 | 1 | 1 | 1 | 1 |
| Accelerator | phr | 4 | 4 | 4 | 4 | 4 |
| Sulfur | phr | 1.7 | 1.7 | 1.7 | 1.7 | 1.7 |
| Tire property |  |  |  |  |  |  |
| Chipping and chunking |  | 100 | 95 | 90 | 100 | 120 |
| ABS dry braking |  | 100 | 99 | 100 | 102 | 102 |
| ABS wet braking |  | 100 | 98 | 100 | 103 | 102 |
| Rolling resistance |  | 100 | 101 | 99 | 99 | 100 |
| Abrasion |  | 100 | 102 | 102 | 100 | 105 |

[e]NS 116 R, Nippon Zeon, Japan, vinyl content; 63% by weight, styrene content: 21% by weight
[f]VN3, Degussa AG, Germany
[c]treated distillate aromatic extract
[d]Coumarone-indene resin, $M_w$ = 270 g/mol, softening point: approx. 10° C., Novares ®C10, Rutgers Chemicals AG, Duisburg It is clear from the tables that only the specific combination of specific carbon black with plasticizers with a low content of polycyclic aromatic compounds and with a specific resin leads to a distinct and surprising improvement in the chipping and chunking behavior both with carbon black mixtures and with silica mixtures. The other tire properties thereby remain unchanged or are even improved, as for example the abrasion.

The exchange of only individual components, as in mixtures 2(V) through 4(V) and 7(V) through 9(V), in contrast, is associated with disadvantages or at most with no change in the chipping and chunking behavior.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. Sulfur-vulcanizable rubber mixture without aromatic process oils formed by combining at least the following:
    (a) at least one diene rubber;
    (b) 5-100 phr (parts by weight, relative to 100 parts by weight of the total rubbers in the mixture) of at least one carbon black with an iodine adsorption number of 100-180 g/kg and a DBP number of 100-150 cm$^3$/100 g;
    (c) 5-80 phr of at least one mineral oil plasticizer that has a content of polycyclic aromatic compounds determined with the DMSO extract according to the IP 346 method of less than 3% by weight relative to the total weight of the mineral oil plasticizer; and
    (d) 5-30 phr of a coumarone-indene resin with a weight-average molecular weight determined with GPC of 250-300 g/mol and a softening point (ring and ball according to ASTM E 28) of less than 40° C.

2. The rubber mixture according to claim 1, wherein the carbon black has an iodine adsorption number of 110-130 g/kg, and a DBP number of 120-140 cm$^3$/100 g.

3. The rubber mixture according to claim 1, wherein the resin has a softening point (ring and ball according to ASTM E 28) of less than 20° C.

4. The rubber mixture according to claim 1, formed by combining at least:
    5-70 phr of at least one of natural rubber, polybutadiene, and synthetic polyisoprene;
    30-95 phr of at least one emulsion-polymerized styrene-butadiene copolymer; and
    30-100 phr of at least one carbon black with an iodine adsorption number of 100-180 g/kg and a DBP number of 100-150 cm$^3$/100 g.

5. The rubber mixture according to claim 4 further including combining up to 50 phr of at least one other styrene-butadiene copolymer.

6. The rubber mixture according to claim 1, formed by combining at least:
    5-70 phr of at least one of natural rubber, polybutadiene, and synthetic polyisoprene;
    30-95 phr of at least one solution-polymerized styrene-butadiene copolymer with a vinyl percentage of above 35%;

5-35 phr of at least one carbon black with an iodine adsorption number of 100-180 g/kg and a DBP number of 100-150 cm$^3$/100 g; and
20-100 phr of silica.

7. The rubber mixture according to claim 6 further including combining up to 60 phr of at least one other styrene-butadiene copolymer.

8. The rubber mixture according to claim 1 which is capable of forming a tire tread for a vehicle pneumatic tire.

9. The rubber mixture according to claim 1 which is vulcanized.

10. A vehicle pneumatic tire with a tread rubber that at least partially comprises a rubber mixture according to claim 1 vulcanized with sulfur.

11. A tire tread comprising the rubber mixture according to claim 1.

12. A tire tread comprising a vulcanized rubber mixture according to claim 1.

13. A method of producing a sulfur-vulcanizable rubber mixture without aromatic process oils comprising combining at least the following:

(a) at least one diene rubber;
(b) 5-100 phr (parts by weight, relative to 100 parts by weight of the total rubbers in the mixture) of at least one carbon black with an iodine adsorption number of 100-180 g/kg and a DBP number of 100-150 cm$^3$/100 g;
(c) 5-80 phr of at least one mineral oil plasticizer that has a content of polycyclic aromatic compounds determined with the DMSO extract according to the IP 346 method of less than 3% by weight relative to the total weight of the mineral oil plasticizer; and
(d) 5-30 phr of a coumarone-indene resin with a weight-average molecular weight determined with GPC of 250-300 g/mol and a softening point (ring and ball according to ASTM E 28) of less than 40° C.

14. The method according to claim 13, wherein the carbon black has an iodine adsorption number of 110-130 g/kg, and a DBP number of 120-140 cm$^3$/100 g.

* * * * *